US009489968B2

(12) United States Patent
Saito

(10) Patent No.: US 9,489,968 B2
(45) Date of Patent: Nov. 8, 2016

(54) THERMALLY-ASSISTED MAGNETIC RECORDING HEAD

(71) Applicant: TDK CORPORATION, Tokyo (JP)

(72) Inventor: Masahiro Saito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/608,355

(22) Filed: Jan. 29, 2015

(65) Prior Publication Data

US 2016/0225390 A1    Aug. 4, 2016

(51) Int. Cl.
*G11B 5/02* (2006.01)
*G11B 5/17* (2006.01)
*G11B 5/48* (2006.01)
*G11B 5/00* (2006.01)

(52) U.S. Cl.
CPC .............. *G11B 5/17* (2013.01); *G11B 5/4826* (2013.01); *G11B 2005/0021* (2013.01)

(58) Field of Classification Search
CPC . G11B 5/1278; G11B 5/3123; G11B 5/3163; G11B 5/3116

USPC ............................ 360/59, 125.27, 123.06, 133
See application file for complete search history.

(56) References Cited

U.S. PATENT DOCUMENTS

| 6,768,556 B1 | 7/2004 | Matsumoto et al. |
| 8,792,209 B2 * | 7/2014 | Sasaki ................. G11B 5/1278 360/123.06 |
| 2003/0066944 A1 | 4/2003 | Matsumoto et al. |
| 2005/0078565 A1 | 4/2005 | Peng et al. |

FOREIGN PATENT DOCUMENTS

| JP | 2001-255254 A | 9/2001 |
| JP | 4032689 B2 | 1/2008 |
| JP | 4104584 B2 | 6/2008 |

* cited by examiner

*Primary Examiner* — Nabil Hindi
(74) *Attorney, Agent, or Firm* — Oliff PLC

(57) ABSTRACT

A thermally-assisted magnetic recording head of the present invention includes: a stacked-layer structure including a first yoke, a second yoke, a first coil, a second coil, and a waveguide; a plasmon generator; a magnetic pole; and one or more contact pillars connecting the first coil in series to the second coil. Here, one or both of the first coil and the second coil include a plurality of wiring patterns connected in parallel.

13 Claims, 13 Drawing Sheets

THERMALLY-ASSISTED MAGNETIC RECORDING HEAD

BACKGROUND OF THE INVENTION

1. Field of the Invention

The invention relates to a thermally-assisted magnetic recording head used in thermally-assisted magnetic recording in which near-field light is applied to a magnetic recording medium to lower a coercivity thereof so as to record information.

2. Description of Related Art

In the past, a magnetic disk unit has been used for writing and reading magnetic information (hereinafter, simply referred to as information). The magnetic disk unit includes, in the housing thereof for example, a magnetic disk in which information is stored, and a magnetic read write head that records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and includes a magnetic write element and a magnetic read element that have an air bearing surface (ABS) facing the magnetic disk. In particular, as the magnetic read element, a magnetoresistive (MR) element exhibiting MR effect is generally used. The other end of the suspension is attached to an end of an arm pivotally supported by a fixed shaft installed upright in the housing.

When the magnetic disk unit is in a stationary state, namely, when the magnetic disk does not rotate and remains stationary, the magnetic read write head is not located over the magnetic disk and is pulled off to the outside (unload state). When the magnetic disk unit is driven and the magnetic disk starts to rotate, the magnetic read write head is changed to a state where the magnetic read write head is moved to a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure, and thus, information is accurately recorded and reproduced.

In recent years, along with a progress in higher recording density (higher capacity) of the magnetic disk, improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured of a plurality of magnetic microparticles. Since it is necessary for the asperity of a boundary between adjacent recording bits to be small in order to increase the recording density, it is necessary for the magnetic microparticles to be made small. However, if the magnetic microparticles are made small in size, thermal stability of the magnetization of the magnetic microparticles is disadvantageously lowered with decrease in volume of the magnetic microparticles. To solve the issue, increasing anisotropy energy of the magnetic microparticle is effective. However, increasing the anisotropy energy of the magnetic microparticle leads to increase in coercivity of the magnetic disk, and as a result, difficulty occurs in the information recording in the existing magnetic head.

As a method to solve the above-described difficulty, a so-called thermally-assisted magnetic recording has been proposed. In the method, a magnetic disk with large coercivity is used, and when information is written, heat is applied together with the magnetic field to a section of the magnetic disk where the information is to be written to increase the temperature and to lower the coercivity of that section, thereby writing the information. Hereinafter, the magnetic head used in the thermally-assisted magnetic recording is referred to as a thermally-assisted magnetic recording head.

In performing the thermally-assisted magnetic recording, near-field light is generally used for applying heat to a magnetic disk. For example, in Japanese Unexamined Patent Application Publication No. 2001-255254 and in Japanese Patent No. 4032689, disclosed is a technology of allowing frequency of light to coincide with a resonant frequency of plasmons that are generated in a metal, by directly applying the light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

Therefore, as a technology capable of avoiding such overheating, in Japanese Patent No. 4104584, a thermally-assisted head using surface plasmon polariton coupling is proposed. In this technology, without direct irradiation of light propagating through a waveguide (guided light) to a plasmon generator, the guided light is coupled to the plasmon generator through evanescent coupling, and surface plasmon polaritons generated on a surface of the plasmon generator are used.

SUMMARY OF THE INVENTION

Incidentally, in recent years, a thermally-assisted magnetic recording head is progressively miniaturized, and accordingly, an amount of heat generation by a thin film coil that induces write magnetic field tends to increase. A phenomenon in which a part of an air bearing surface protrudes toward an opposing magnetic disk easily occurs by the heat generation of the thin film coil. When such protrusion phenomenon of the thermally-assisted magnetic recording head remarkably occurs, it is concerned that the protrusion phenomenon prevents accurate write operation of magnetic information. Therefore, it is desirable to provide a thermally-assisted magnetic recording head capable of suppressing protrusion of the air bearing surface during operation and performing magnetic recording with higher density.

A thermally-assisted magnetic recording head according to an embodiment of the present invention includes: a stacked-layer structure including a first yoke, a second yoke, a first coil, a second coil, and a waveguide; a plasmon generator; a magnetic pole; and one or more contact pillars connecting the first coil in series to the second coil. Here, one or both of the first coil and the second coil include a plurality of wiring patterns connected in parallel.

A head gimbal assembly, a head arm assembly, and a magnetic disk unit according to respective embodiments of the present invention are each provided with the above-described thermally-assisted magnetic recording head.

In the thermally-assisted magnetic recording head, the head gimbal assembly including the same, the head arm assembly including the same, and the magnetic disk unit including the same according to the respective embodiments of the invention, one or both of the first coil and the second coil include the plurality of wiring patterns configuring a parallel circuit. Therefore, as compared with a case where both of the first coil and the second coil do not include parts configuring the parallel circuit, entire resistance of the first coil and the second coil is reduced. Accordingly, it is possible to decrease heat quantity generated by the entire first and second coils in recording operation, and to suppress protrusion of the air bearing surface. As a result, accurate write operation of the magnetic information is allowed to be performed and improvement of the product lifetime is expected.

In the thermally-assisted magnetic recording head, the head gimbal assembly including the same, the head arm assembly including the same, and the magnetic disk unit including the same according to the respective embodiments of the invention, only the first coil may include the pair of wiring patterns connected in parallel. In this case, for example, a pair of first back gaps connected to the first yoke, the first back gaps being oppositely disposed with the waveguide in between, and a pair of second back gaps connected to the second yoke and intersect the waveguide may be further provided, and the pair of first back gaps may be respectively connected to the pair of second back gaps. Further in this case, the pair of wiring patterns connected in parallel may respectively surround the pair of first back gaps and respectively wind in the first direction, and the second coil may so wind in the first direction as to surround the pair of second back gaps. Moreover, only the second coil may include the pair of wiring patterns connected in parallel.

DETAILED DESCRIPTION OF THE PREFERRED EMBODIMENTS

Hereinafter, an embodiment of the invention will be described in detail with reference to drawings.

<1. Configuration of Magnetic Disk Unit>

First, referring to FIG. 1 and FIG. 2, a configuration of a magnetic disk unit according to an embodiment of the present invention will be described below.

Figure 1:
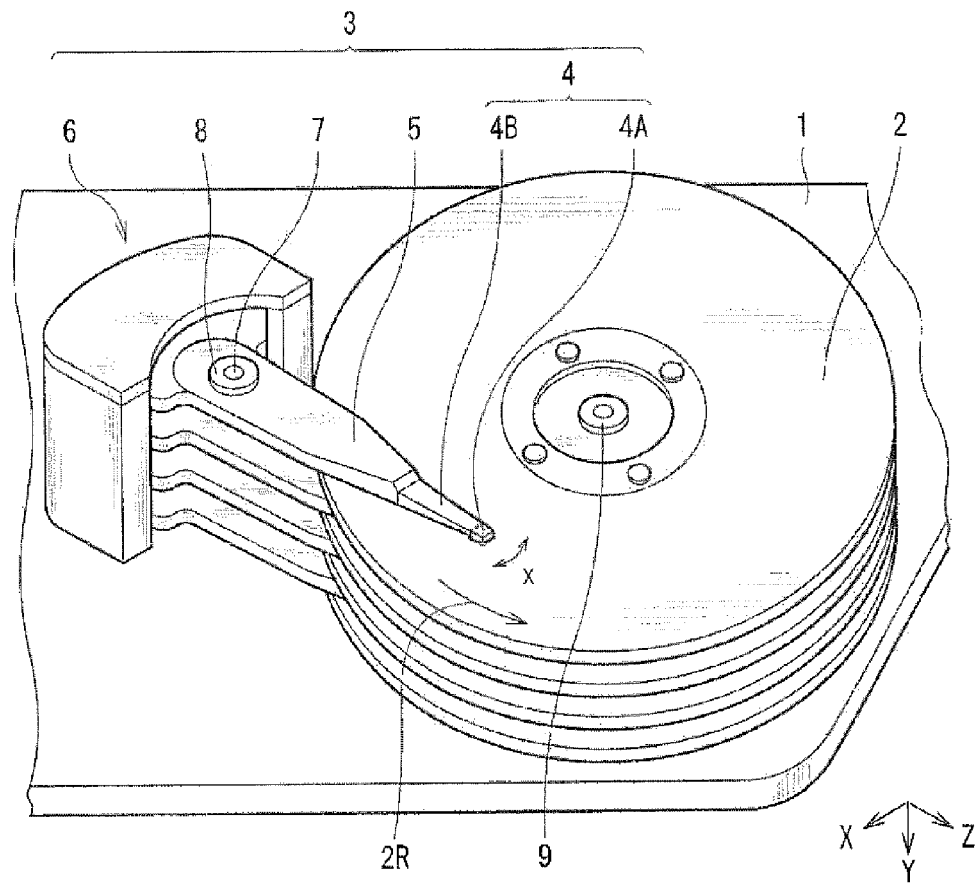
FIG. 1 is a perspective view illustrating a configuration of a magnetic disk unit provided with a magnetic read write head according to an embodiment of the invention.

FIG. 1 is a perspective view illustrating an internal configuration of the magnetic disk unit as the present embodiment. The magnetic disk unit adopts a load-unload system as a driving system, and may include, for example, in a housing 1, a magnetic disk 2 as a magnetic recording medium in which information is to be written, and a Head Arm Assembly (HAA) 3 for writing information in the magnetic disk 2 and reading the information. The HAA 3 includes a Head Gimbals Assembly (HGA) 4, an arm 5 supporting a base of the HGA 4, and a driver 6 as a power source for allowing the arm 5 to pivot. The HGA 4 includes a thermally-assisted magnetic head device (hereinafter, simply referred to as a "magnetic head device") 4A having a side surface provided with a magnetic read write head 10 (described later) according to the present embodiment, and a suspension 4B having an end provided with the magnetic head device 4A. The arm 5 supports the other end of the suspension 4B (an end opposite to the end provided with the magnetic head device 4A). The arm 5 is so configured as to be pivotable, through a bearing 8, around a fixed shaft 7 fixed to the housing 1. The driver 6 may be configured of, for example, a voice coil motor. Incidentally, the magnetic disk unit has one or a plurality of (FIG. 1 exemplifies the case of four) magnetic disks 2, and the magnetic head devices 4A are disposed corresponding to recording surfaces (a front surface and a back surface) of the respective magnetic disks 2. Each of the magnetic head devices 4A is movable in a direction across write tracks, that is, in a cross track direction (in an X-axis direction) in a plane parallel to the recording surfaces of each of the magnetic disks 2. On the other hand, the magnetic disk 2 rotates around a spindle motor 9 fixed to the housing 1 in a rotation direction 2R substantially orthogonal to the X-axis direction. With the rotation of the magnetic disk 2 and the movement of the magnetic head devices 4A, information is written into the magnetic disk 2 or stored information is read out. Further, the magnetic disk unit has a control circuit (described later) that controls a write operation and a read operation of the magnetic read write head 10, and controls emission operation of a laser diode as a light source that generates laser light used for thermally-assisted magnetic recording described later.

Figure 2:
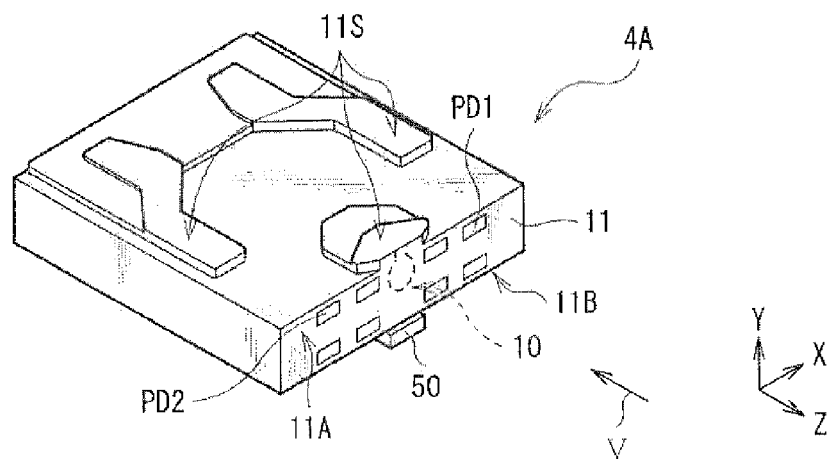
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 that may be formed of, for example, Al$_2$O$_3$.TiC (AlTiC). The slider 11 may be substantially formed as a hexahedron, for example, and one surface thereof corresponds to an ABS 11S that is disposed in proximity to and to face the recording surface of the magnetic disk 2. When the magnetic disk unit is not driven, namely, when the spindle motor 9 is stopped and the magnetic disk 2 does not rotate, the magnetic head device 4A is pulled off to the position away from an above part of the magnetic disk 2 (unload state), in order to prevent contact of the ABS 11S and the recording surface. In contrast, when the magnetic disk unit is initiated, the magnetic disk 2 starts to rotate at a high speed by the spindle motor 9, the arm 5 is pivotably moved around the fixed shaft 7 by the driver 6, and therefore, the magnetic head device 4A moves above the front surface of the magnetic disk 2, thereby being in a load state. The rotation of the magnetic disk 2 at a high speed causes air flow between the recording surface and the ABS 11S, and lift force caused by the air flow leads to a state where the magnetic head device 4A floats to maintain a certain distance (magnetic spacing) along a direction (a Y-axis direction) orthogonal to the recording surface. In addition, on an element forming surface 11A that is one side surface orthogonal to the ABS 11S, the magnetic read write head 10 and a plurality of pads including pads PD1 and PD2 are provided. Incidentally, on a surface 11B opposite to the ABS 11S of the slider 11, a light source unit 50 is provided near the magnetic read write head 10.

<2. Detailed Structure of Magnetic Read Write Head>

Next, the magnetic read write head 10 is described in more detail with reference to FIG. 3A to FIG. 6A.

Figure 3A:
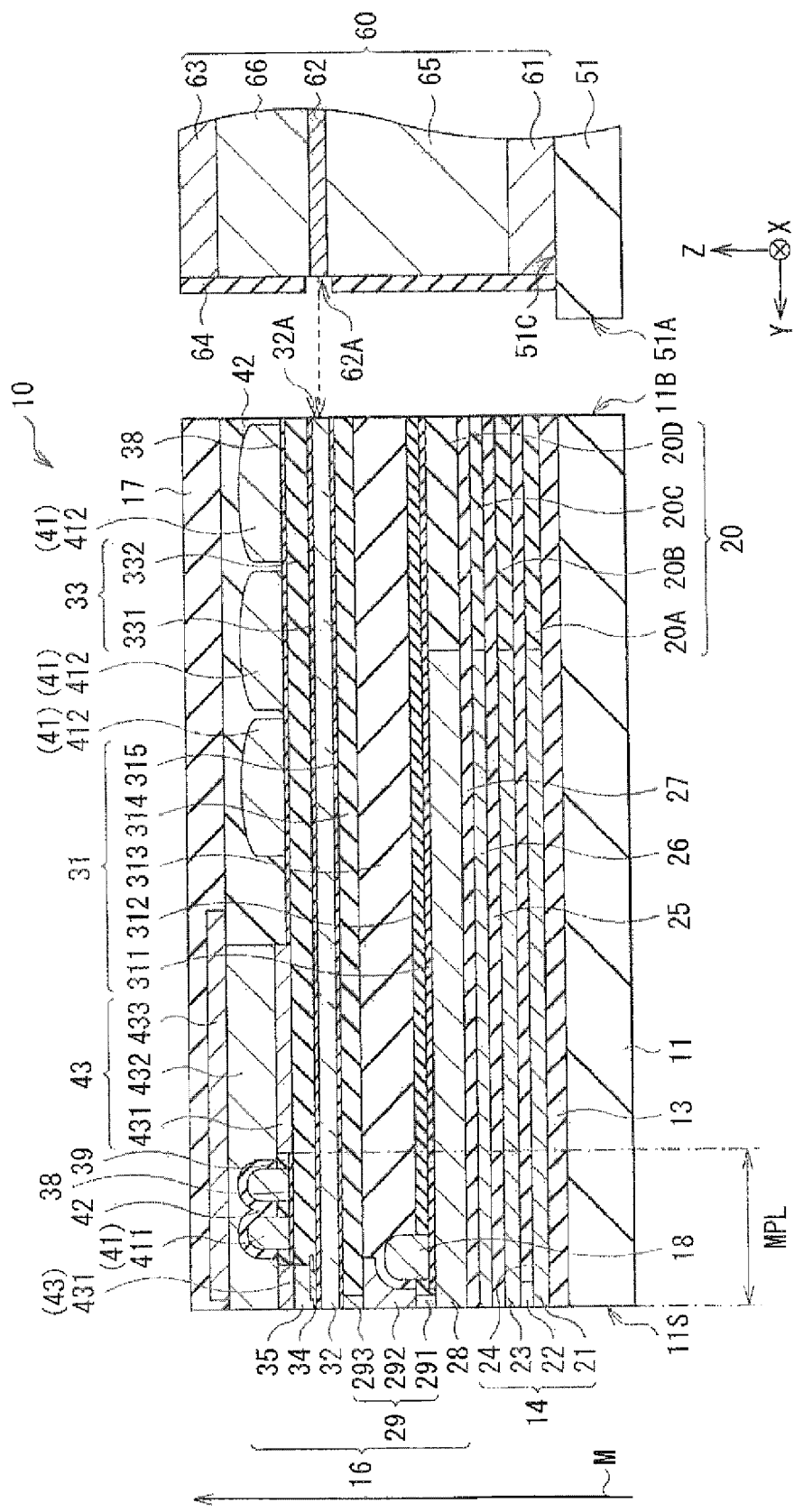
FIG. 3A is a sectional view illustrating a structure of a cross-sectional surface (YZ cross-sectional surface) orthogonal to an air bearing surface, in the magnetic read write head illustrating in FIG. 2.
Figure 3B:
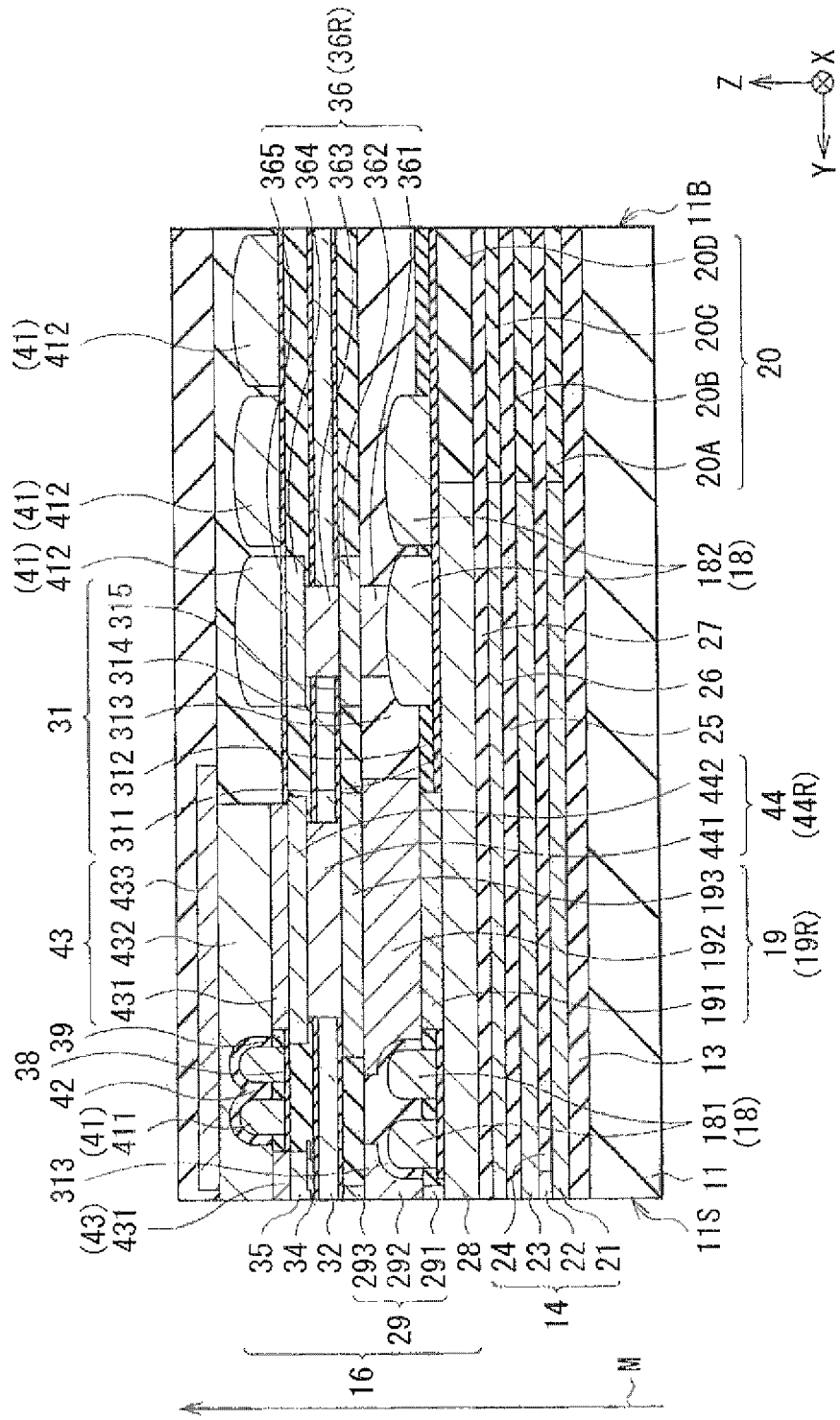
FIG. 3B is another sectional view illustrating the structure of the cross-sectional surface (the YZ cross-sectional surface) orthogonal to the air bearing surface, in the magnetic read write head illustrated in FIG. 2.
Figure 4:
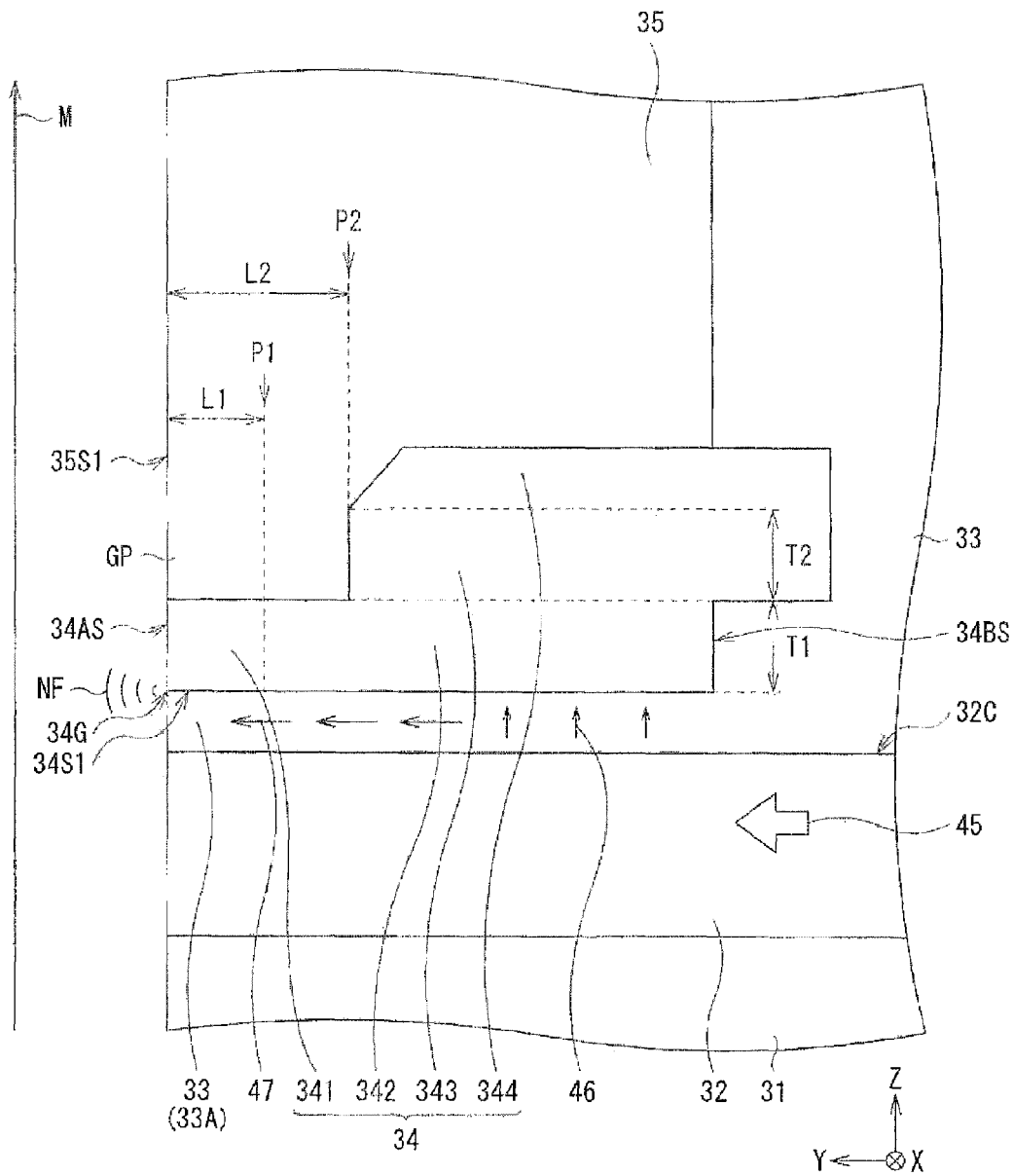
FIG. 4 is a sectional view illustrating a main part of the magnetic read write head illustrated in FIG. 3A in an enlarged manner.
Figure 5A:
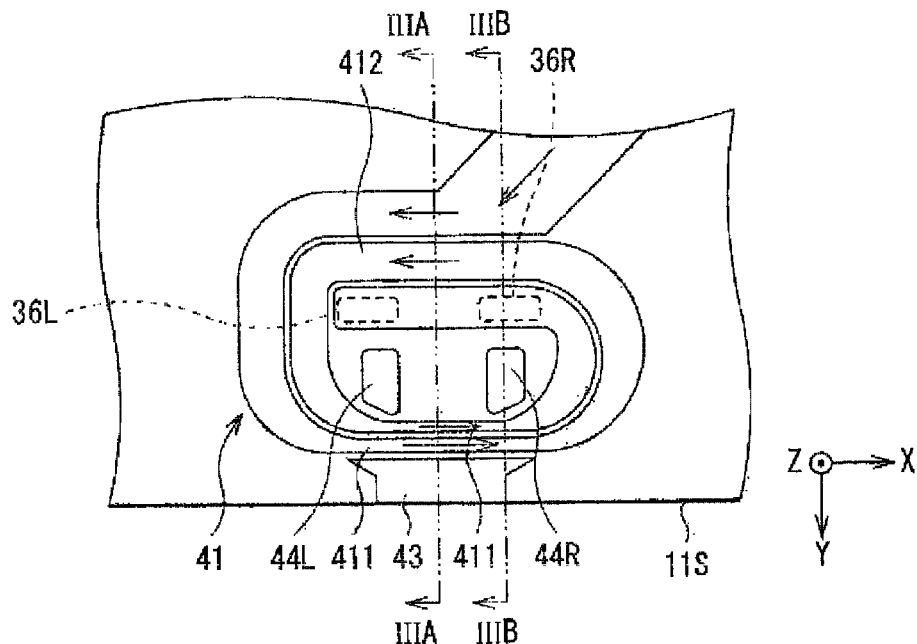
FIG. 5A is a plan view illustrating a planar shape of an upper coil illustrated in FIG. 3A and FIG. 3B.
Figure 5B:
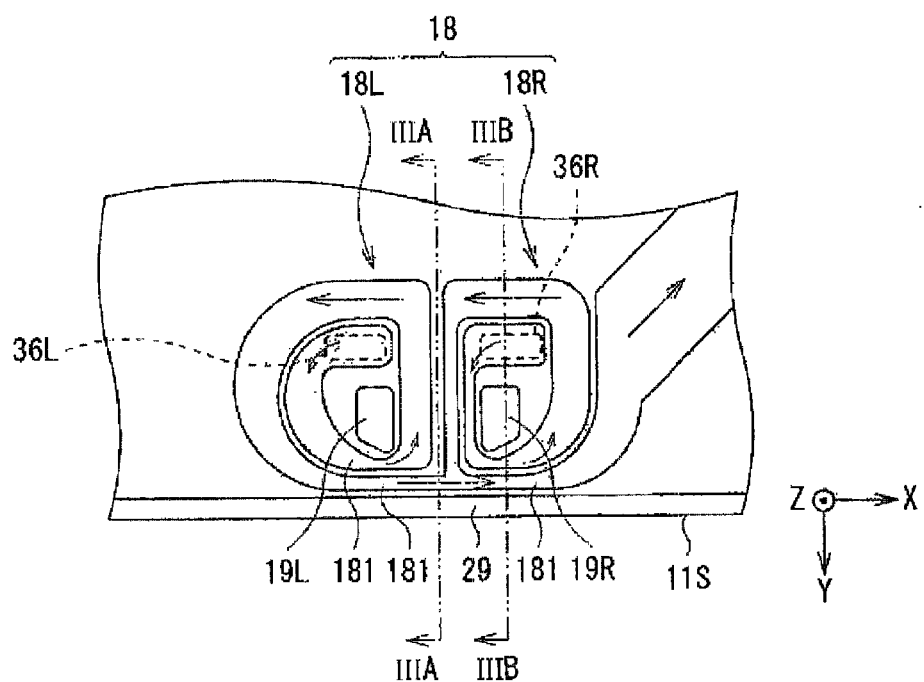
FIG. 5B is a plan view illustrating a planar shape of a lower coil illustrated in FIG. 3A and FIG. 3B.
Figure 6A:
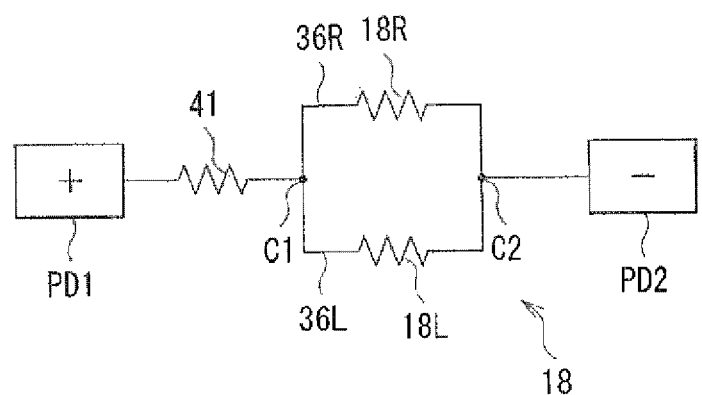
FIG. 6A is a circuit diagram for explaining connection relationship between the lower coil and the upper coil, in the magnetic read write head illustrated in FIG. 3A.

FIGS. 3A and 3B are sectional views of the magnetic read write head 10 illustrated in FIG. 2, in the YZ cross-sectional surface orthogonal to the ABS 11S, and FIG. 4 is an enlarged sectional view illustrating a part of FIG. 3A in an enlarged manner. Further, FIG. 5A is a plan view illustrating a layer that includes an upper coil 41 illustrated in FIGS. 3A and 3B, in an XY plane, and FIG. 5B is a plan view illustrating a layer that includes a lower coil 18 illustrated in FIGS. 3A and 3B, in the XY plane. Note that FIG. 3A is a sectional view in an arrow direction along IIIA-IIIA line illustrated in FIGS. 5A and 5B, and FIG. 3B is a sectional view in an arrow direction along IIIB-IIIB line illustrated in FIGS. 5A and 5B. Further, FIG. 6A is a circuit diagram for explaining connection relationship between the lower coil 18 and the upper coil 41. Note that an up-arrow M illustrated in FIGS. 3A and 3B and FIG. 4 indicates a direction in which the magnetic disk 2 moves relative to the magnetic read write head 10.

In the following description, dimensions in the X-axis direction, the Y-axis direction, and the Z-axis direction are referred to as "width", "height" or "length", and "thickness", respectively, and a closer side and a farther side to/from the ABS 11S in the Y-axis direction are referred to as "forward" and "backward", respectively. Moreover, the direction of the arrow M is referred to as "trailing side", a direction opposite to the direction of the arrow M is referred to as "leading side", and the X-axis direction and the Z-axis direction are referred to as "cross track direction" and "down track direction", respectively.

The magnetic read write head 10 has a stacked structure including an insulating layer 13, a read head section 14, a write head section 16, and a protective layer 17 that are stacked in order on the slider 11. Each of the read head section 14 and the write head section 16 has an end surface exposed on the ABS 11S.

The read head section 14 uses magneto-resistive effect (MR) to perform a read process. The read head section 14 may be configured by stacking, for example, a lower shield layer 21, an MR element 22, and an upper shield layer 23 in this order on the insulating layer 13.

The lower shield layer 21 and the upper shield layer 23 may be respectively formed of, for example, a soft magnetic metal material such as NiFe (nickel iron alloy), and are disposed to face each other with the MR element 22 in between in the stacking direction (in the Z-axis direction). As a result, these layers each exhibit a function to protect the MR element 22 from the influence of an unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as Al$_2$O$_3$ (aluminum oxide), AlN (aluminum nitride), SiO$_2$ (silicon dioxide), and DLC (diamond-like carbon).

The MR element 22 functions as a sensor to read magnetic information written in the magnetic disk 2. The MR element 22 is, for example, a CPP (Current Perpendicular to Plane)-GMR (Giant Magnetoresistive) element, sense current of which flows inside thereof in a stacking direction. In this case, the lower shield layer 21 and the upper shield layer 23 each function as an electrode to supply the sense current to the MR element 22.

In the read head section 14 with such a structure, a magnetization direction of a free layer (not illustrated) included in the MR element 22 changes in response to a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change of the magnetization direction appears as the change of the electric resistance, and thus, the signal magnetic field is detected with use of the change and the magnetic information is accordingly read out.

On the read head section 14, an insulating layer 25, an intermediate shield layer 26, and an insulating layer 27 are stacked in order. A lower yoke layer 28 configuring a part of the write head section 16 is provided on the insulating layer 27. Note that the backward of the lower shield layer 21 is occupied by an insulating layer 20A, the backward of the upper shield layer 23 is occupied by an insulating layer 20B, the backward of the intermediate shield layer 26 is occupied by an insulating layer 20C, and the backward of the lower yoke layer 28 is occupied by an insulating layer 20D. The intermediate shield layer 26 functions to prevent a magnetic field that is generated in the write head section 16 from reaching the MR element 22, and may be formed of, for example, a soft magnetic metal material such as NiFe. The insulating layers 25 and 27 may be formed of the similar material to that of the insulating layer 24, for example.

The write head section 16 is a perpendicular magnetic write head performing a writing process of thermally-assisted magnetic recording system. The write head section 16 may have, for example, the lower yoke layer 28, a leading shield 29, a waveguide 32, a plasmon generator 34, and a magnetic pole 35, along the ABS 11S on the insulating layer 27. Further, the lower coil 18 embedded in the cladding layer 31 is provided between the lower yoke layer 28 and the waveguide 32 at the backward of the leading shield 29. Moreover, the upper coil 41 is provided between the waveguide 32 and an upper yoke layer 43. Note that the leading shield 29 may be omitted from the structure.

As illustrated in FIG. 5B, the lower coil 18 includes a pair of wiring patterns 18L and 18R winding in the XY plane. The wiring patterns 18L and 18R in the pair are included in the same layer, and are connected in parallel to each other (see FIG. 6A). Note that the wiring pattern 18L and the wiring pattern 18R may be provided in layers different from each other; however, when both are included in the same layer, the wiring patterns are easily formed collectively, which is suitable for decrease in thickness of the write head section 16. On the other hand, as illustrated in FIG. 5A, the upper coil 41 includes one wiring pattern winding in the XY plane.

The write head section 16 is connected to the lower yoke layer 28, is connected to a pair of lower back gaps 19L and 19R that are oppositely disposed with the waveguide 32 in between in the cross track direction, and the upper yoke layer 43, and further includes a pair of upper back gaps 44L and 44R that are oppositely disposed with the waveguide 32 in between in the cross track direction (see FIG. 5A and FIG. 5B). Here, the lower back gap 19L is connected to the upper back gap 44L, and the lower back gap 19R is connected to the upper back gap 44R. For example, as illustrated in FIG. 3B, the lower back gap 19R is configured by stacking magnetic layers 191 to 193 in order on the lower yoke layer 28. The lower back gap 19L also has the similar structure to that of the lower back gap 19R. Moreover, the upper back gap 44R is configured by stacking a magnetic layer 441 and a magnetic layer 442 in order on the magnetic layer 193 of the lower back gap 19R. An upper surface of the magnetic layer 442 is in contact with a lower surface of the magnetic layer 431 configuring the upper yoke layer 43. The upper back gap 44L also has the similar structure to that of the upper back gap 44R.

The wiring patterns 18L and 18R in the pair connected in parallel respectively surround the lower back gaps in the pair in the XY plane, and wind in the same direction (in the left direction from an inner peripheral side toward an outer peripheral side in a top view of the lower yoke layer 28 viewed from the upper yoke layer 43, for example). Moreover, the upper coil 41 so winds in the direction same as the direction of the pair of wiring patterns 18L and 18R as to surround a region occupied by the pair of upper back gaps 44L and 44R.

A size in the Y direction of a forward part 181 of the pair of wiring patterns 18L and 18R, namely, a size in the Y direction of a part located between the lower back gaps 19L and 19R and the ABS 11S may be preferably smaller than a size in the Y direction of a backward part 182 located at the backward of the lower back gap 19L and 19R (FIG. 5B and FIG. 3B). Likewise, a size in the Y direction of a forward part 441 of the upper coil 41 located between the upper back gaps 44L and 44R and the ABS 11S may be preferably smaller than a size in the Y direction of a backward part 412 located at the backward of the upper back gaps 44L and 44R (FIG. 5A and FIG. 3A). This is because making the size in the Y direction of the forward part 181 and the forward part 411 small in this way is advantageous in reduction of a magnetic path length MPL (see FIG. 3A).

The write head section 16 further includes a pair of contact pillars 36L and 36R that connects the lower coil 18 in series to the upper coil 41 (see FIG. 5A, FIG. 5B, and FIG. 6A). The contact pillars 36L and 36R in the pair are oppositely disposed with the waveguide 32 in between in the cross track direction (see FIG. 5A and FIG. 5B). More specifically, for example, as illustrated in FIG. 3B, the contact pillar 36R has a stacked-layer structure configured of conductive layers 361 to 365 that are stacked in order between the backward part 182 of the wiring pattern 18R and the backward part 412 of the upper coil 41. The same applies to the contact pillar 36L.

As illustrated in FIG. 6A, an end of the upper coil 41 and an end of the lower coil 18 are connected in series, the other end of the upper coil 41 is connected to the pad PD1, and the other end of the lower coil 18 is connected to the pad PD2. For example, when a positive potential is applied to the pad PD1 and a negative potential is applied to the pad PD2, a current flows through the upper coil 41 and the lower coil 18 in directions illustrated by respective arrows, as illustrated in FIG. 5A and FIG. 5B.

The lower yoke layer 28, the leading shield 29, the lower back gaps 19L and 19R, the upper back gaps 44L and 44R, and the contact pillars 36L and 36R are each formed of a soft magnetic metal material such as NiFe. The leading shield 29 is located at the frontmost end of the upper surface of the lower yoke layer 28 in such a manner that one end surface thereof is exposed on the ABS 11S. The leading shield 29 has a structure in which, for example, a lower layer part 291, an intermediate part 292, and an upper layer part 293 are stacked in order along the ABS 11S. Non-magnetic layers 311 to 314 are so stacked in order as to cover the lower yoke layer 28 and the insulating layer 20D, at the backward of the leading shield 29. Further, a non-magnetic layer 315 is so provided as to cover the upper layer part 293 and the non-magnetic layer 314. The non-magnetic layers 311 to 315 configure the cladding layer 31 as a whole. The lower coil 18 is provided on the non-magnetic layer 411 at the backward of the leading shield 29, and is embedded in the non-magnetic layer 312 and the non-magnetic layer 313.

The waveguide 32 is provided on the cladding layer 31. The waveguide 32 has an upper surface covered by the cladding layer 33 (a non-magnetic layer 331 and a non-magnetic layer 332), extends in a direction (the Y-axis direction) orthogonal to the ABS 11S, and for example, one end surface thereof may be exposed on the ABS 11S and the other end surface (a backward end surface 32A) thereof may be exposed at the backward thereof. Note that the front end surface of the waveguide 32 may be located at a position receded from the ABS 11S without being exposed on the ABS 11S. The waveguide 32 is formed of a dielectric material allowing laser light to pass therethrough. Specifically, the waveguide 32 may be formed of a material essentially containing one or more of, for example, SiC, DLC, TiOx (titanium oxide), TaOx (tantalum oxide), SiNx (silicon nitride), $SiO_xN_y$ (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Essentially containing means that the above-described materials are contained as main components, and other materials may be contained as subcomponents (for example, impurity) as long as having a refractive index higher than those of the cladding layers 31 and 33. The waveguide 32 allows laser light from a laser diode 60 (described later) to propagate toward the ABS 11S. Incidentally, although the cross-sectional shape parallel to the ABS 11S of the waveguide 32 may be, for example, a rectangle, it may have other shapes.

The cladding layers 31 and 33 are each formed of a dielectric material having a refractive index, with respect to laser light propagating through the waveguide 32, lower than that of the waveguide 32. The cladding layers 31 and 33 may be formed of a material essentially containing one or more of, for example, SiOx (silicon oxide), $Al_2O_3$ (aluminum oxide), AlN (aluminum nitride), BeO (beryllium oxide), SiC (silicon carbide), and DLC (diamond-like carbon). Essentially containing means that the above-described materials are contained as main components, and the other materials may be contained as subcomponents (for example, impurity) as long as having a refractive index lower than that of the waveguide 32.

The write head section 16 further includes the plasmon generator 34 provided on the forward end of the waveguide 32 with the first layer 331 of the cladding layer 33 in between, and the magnetic pole 35 provided on the plasmon generator 34.

The plasmon generator 34 generates near-field light NF from the ABS 11S based on the laser light that has propagated through the waveguide 32. The plasmon generator 34 includes a first region 341 and a second region 342 located backward thereof. The first region 341 includes an end surface 34AS (see FIG. 4) exposed on the ABS 11S. The second region 342 is coupled with the other end of the first region 341 opposite to the ABS 11S at a position P1 and may have a volume greater than that of the first region 341, for example.

The first region 341 extends backward from the ABS 11S to the position P1 over a length L1 while maintaining a constant area of a cross-sectional surface parallel to the ABS 11S, for example. The position P1 is a position of a boundary between the first region 341 and the second region 342.

The second region 342 may preferably have a width larger than a width of the first region 341, for example. A thickness of the second region 342 may be equal to a thickness of the first region 341, for example. The second region 342 is coupled with the first region 341 at the position P1 and extends backward.

The material of the plasmon generator 34 is a metal material (hereinafter, referred to as a first metal material) containing one or more of, for example, Pd (palladium), Pt (platinum), Rh (rhodium), Ir (iridium), Ru (ruthenium), Au (gold), Ag (silver), Cu (copper), and aluminum (Al). Among them, Au, Ag, and Cu are more preferable, and Au is most preferable. This is because it is excellent in chemical stability, and more efficiently generates near-field light NF (described later). Note that the material of the first region 341 may be desirably the same as that of the second region 342. This is to efficiently generate the near-field light NF. In addition, this is to avoid complication in manufacturing.

A third region 343 configuring a part of the plasmon generator 34 is provided on the second region 342. A forward end surface of the third region 343 is located at a position P2 receded from the ABS 11S. A fourth region 344 is further provided on the third region 343. For example, the fourth region 344 may extend backward from the position P2, and may cover a part or all of the third region 343. In this way, the second to fourth regions 342 to 344 that have a volume sufficiently greater than that of the first region 341 having one end exposed on the ABS 11S function as a heatsink that efficiently dissipates heat generated by the plasmon generator 34 during operation. Note that an insulating gap layer that separates the first region 341 from the magnetic pole 35 may be provided at the forward of the third region 343.

The magnetic pole 35 has an end surface 35S1 exposed on the ABS 11S, and is provided on the plasmon generator 34. The magnetic pole 35 contains a magnetic flux generated by the lower coil 18 and the upper coil 14, and emits the magnetic flux from the ABS 11S to generate a write magnetic field for writing magnetic information in the magnetic disk 2. The magnetic flux 35 may be formed of a magnetic material with high saturation flux density such as iron-based alloy. Examples of the iron-based alloy may include FeCo (iron cobalt alloy), FeNi (iron nickel alloy), and FeCoNi (iron cobalt nickel alloy). Incidentally, although a cross-sectional shape of the first layer 351 parallel to the ABS 11S may be, for example, an inverted trapezoid or a rectangle, it may be other shapes.

As illustrated in FIGS. 3A and 3B, surroundings of the plasmon generator 34 and the magnetic pole 35 are covered by the cladding layer 33. The cladding layer 33 has the first layer 331 that extends between the waveguide 32 and the plasmon generator 34, and the second layer 332 that is provided on the first layer 331 and occupies the backward and the sides of the plasmon generator 34 and the magnetic pole 35.

As illustrated in FIGS. 3A and 3B, the upper coil 41 and the upper yoke layer 43 are provided on the cladding layer 33. The upper coil 41 is so provided on the insulating layer 38 covering the cladding layer 33 located at the backward of the magnetic pole 35, as to swirl. The upper coil 41 so wind in the direction same as the direction of the wiring patterns 18L and 18R of the lower coil 18 as to surround a part of the upper yoke 43 that is coupled with the upper back gaps 44L and 44R. The upper coil 41 generates recording-use magnetic flux by a write current flowing therethrough, and is formed of a high conductive material such as Cu (copper) and Au (gold). The surroundings of the upper coil 41 are covered by the insulating layer 39 or the insulating layer 42. The insulating layers 38 and 39 are each formed of an insulating material such as $Al_2O_3$, AlN, $SiO_2$ and DLC. The insulating layer 42 may be formed of, for example, a non-magnetic insulating material flowing on heating, such as a photoresist or a spin on glass (SOG). The insulating layers 38, 39, and 42 each electrically separate the coil 41 from its surroundings.

The upper yoke layer 43 is so provided as to further cover the insulating layer 42 that covers the forward part 411 of the upper coil 41. The upper yoke layer 43 has a first layer 431 that covers the magnetic pole 35, the second layer 332 of the cladding layer 33, and the magnetic layer 442 of the upper back gaps 44L and 44R, a second layer 432 covering the first layer 431, and a third layer 433 provided on the second layer 432. A forward end surface of the third layer 433 is located at a position receded from the ABS 11S. The upper yoke layer 43 may be formed of, for example, a soft magnetic material with high saturation flux density such as CoFe, the front section thereof is connected to the magnetic pole 35, and a part of the backward section is connected to the upper back gaps 44L and 44R.

In the write head section 16 having such a structure, by the write current flowing through the lower coil 18 and the upper coil 41, magnetic flux is generated inside a magnetic path that is mainly configured by the leading shield 29, the lower yoke layer 28, the lower back gaps 19L and 19R, the upper back gaps 44L and 44R, the upper yoke layer 43, and the magnetic pole 35. Accordingly, a write magnetic field (a signal magnetic field) is generated near the end surface of the magnetic pole 35 exposed on the ABS 11S, and the write magnetic field reaches a predetermined region of the recording surface of the magnetic disk 2.

Further, in the magnetic read write head 10, for example, the protective layer 17 that may be formed of a material similar to that of the cladding layer 33 is so formed as to cover the entire upper surface of the write head section 16. In other words, the cladding layer 33 and the protective layer 17 that are each formed of a material having a lower refractive index and higher thermal conductivity compared with the waveguide 32 are so provided as to collectively surround the waveguide 32, the plasmon generator 34, and the magnetic pole 35.

<3. Detailed Configuration of Light Source Unit>

The light source unit 50 is described in more detail with reference to FIG. 3A again. As illustrated in FIG. 3A, the light source unit 50 provided at the back side of the magnetic read write head 10 includes the laser diode 60 as a light source emitting laser light, and, for example, a rectangular parallelepiped supporting member 51 supporting the laser diode 60.

The supporting member 51 may be formed of, for example, a ceramic material such as $Al_2O_3.TiC$. As illustrated in FIG. 3A, the supporting member 51 includes a bonded surface 51A to be bonded to the back surface 11B of the slider 11, and a light source mounting surface 51C orthogonal to the bonded surface 51A. The light source mounting surface 51C is parallel to the element forming surface 11A. The laser diode 60 is mounted on the light source mounting surface 51C. The supporting member 51 may desirably have a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based one may be used as the laser diode 60. The wavelength of the laser light emitted from the laser diode 60 may be any value within the range of, for example, 375 nm to 1.7 µm. Specifically, it may be a laser diode of InGaAsP/InP quaternary mixed crystal with the emission wavelength region of 1.2 to 1.67 µm. As illustrated in FIG. 3A, the laser diode 60 has a multilayer structure including a lower electrode 61, an active layer 62, and an upper electrode 63. For example, an n-type semiconductor layer 65 including n-type AlGaN may be interposed between the lower electrode 61 and the active layer 62, and for example, a p-type semiconductor layer 66 including p-type AlGaN may be interposed between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an opening for emitting laser light is provided at a position including an emission center 62A of the active layer 62. The relative positions of the light source unit 50 and the magnetic read write head 10 are fixed by bonding the bonded surface 51A of the supporting member 51 to the back surface 11B of the slider 11 in such a manner that the emission center 62A and the backward end surface 32A of the waveguide 32 are coincident with each other. A thickness $T_{LA}$ of the laser diode 60 may be, for example, about 60 to 200 µm. When a predetermined voltage is applied between the lower electrode 61 and the upper electrode 63, laser light is emitted from the emission center 62A of the active layer 62, and then enters the backward end surface 32A of the waveguide 32. Incidentally, the laser light emitted from the laser diode 60 may be preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 5 V, for example, and the voltage generated by the power source is sufficient to drive the laser diode 60. In addition, the laser diode 60 consumes power of, for example, about several tens mW, which is sufficiently covered by the power source in the magnetic disk unit.

<4. Control Circuit of Magnetic Disk Unit and Operation>

Figure 7:
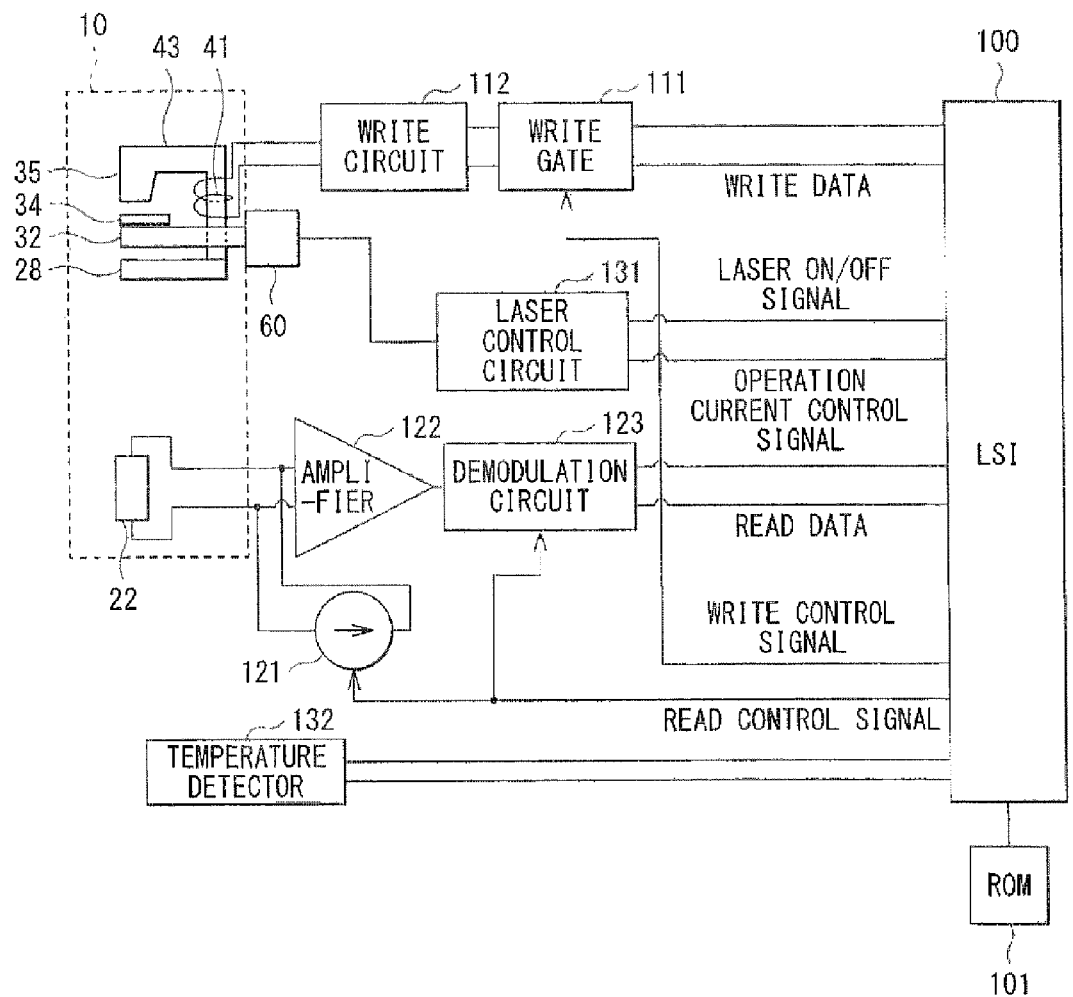
FIG. 7 is a block diagram illustrating a circuit configuration of the magnetic disk unit illustrated in FIG. 1.

With reference to FIG. 7, the circuit configuration of the control circuit of the magnetic disk unit illustrated in FIG. 1 and the operation of the magnetic read write head 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Here, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100. The ROM 101 holds a control table and the like to control an operation current value to be supplied to the laser diode 60. At the time of write operation, the control LSI 100 supplies the write data to the write gate 111. The write gate 111 supplies the write data to the write circuit 112 only when the write control signal instructs to perform the write operation. The write circuit 112 allows the write current to flow through the upper coil 41 and the lower coil 18 according to the write data. As a result, the write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs to perform the read operation.

The laser control circuit 131 controls the supply of the operation current to the laser diode 60 based on the laser ON/OFF signal, and controls the value of the operation current supplied to the laser diode 60 based on the operation current control signal. The operation current equal to or larger than an oscillation threshold is supplied to the laser diode 60 by the control of the laser control circuit 131 when the laser ON/OFF signal instructs to perform the ON operation. As a result, the laser light is emitted from the laser diode 60 and then the laser light propagates through the waveguide 32. Subsequently, the near-field light NF (described later) is generated from the tip section 34G of the plasmon generator 34, a part of the magnetic recording layer of the magnetic disk 2 is heated by the near-field light NF, and thus the coercivity in that part is lowered. At the time of writing, the write magnetic field generated from the magnetic pole 35 is applied to the part of the magnetic recording layer with lowered coercivity, and therefore data recording is performed.

The control LSI 100 determines a value of the operation current of the laser diode 60 with reference to the control table stored in the ROM 101, based on the temperature of the magnetic recording layer of the magnetic disk 2 measured by the temperature detector 132 and the like, and controls the laser control circuit 131 with use of the operation current control signal in such a manner that the operation current of the value is supplied to the laser diode 60. The control table may include, for example, the oscillation threshold of the laser diode 60 and data indicating temperature dependency of light output-operation current property. The control table may further include data indicating relationship between the operation current value and the increased amount of the temperature of the magnetic recording layer heated by the near-field light NF, and data indicating temperature dependency of the coercivity of the magnetic recording layer.

The control circuit illustrated in FIG. 7 has a signal system to control the laser diode 60, that is, a signal system of the laser ON/OFF signal and the operation current control signal, independent of the control signal system of write-read operation, and therefore, more various conduction modes to the laser diode 60 are achievable, in addition to the conduction to the laser diode 60 simply operated in conjunction with the write operation. Note that the configuration of the control circuit of the magnetic disk unit is not limited to that illustrated in FIG. 7.

Subsequently, a principle of near-field light generation in the present embodiment and a principle of thermally-assisted magnetic recording with use of the near-field light will be described with reference to FIG. 4 again.

Laser light 45 which has been emitted from the laser diode 60 propagates through the waveguide 32 to reach near the plasmon generator 34. At this time, the laser light 45 is totally reflected by an evanescent light generating surface 32C that is an interface between the waveguide 32 and a buffer section 33A (a section between the waveguide 32 and the plasmon generator 34, of the cladding layer 33), and therefore evanescent light 46 leaking into the buffer section 33A is generated. After that, the evanescent light 46 couples with charge fluctuation on a surface plasmon exciting surface 34S1 facing the waveguide 32, of the plasmon generator 34 to induce a surface plasmon polariton mode. As a result, surface plasmons 47 are excited on the surface plasmon exciting surface 34S1. The surface plasmons 47 propagate on the surface plasmon exciting surface 34S1 toward the ABS 11S.

The surface plasmons 47 eventually reach the ABS 11S, and as a result, the near-field light NF is generated on the tip section 34G. The near-field light NF is irradiated toward the magnetic disk 2 (not illustrated in FIG. 4) and reaches the surface of the magnetic disk 2 to heat a part of the magnetic recording layer of the magnetic disk 2. As a result, the coercivity at the heated part of the magnetic recording layer is lowered. In the thermally-assisted magnetic recording, the write magnetic field generated by the magnetic pole 35 is applied to the part of the magnetic recording layer with the coercivity thus lowered, to perform data writing.

<5. Effects>

As described above, in the magnetic read write head 10 of the present embodiment, out of the lower coil 18 and the upper coil 41 that are so arranged as to sandwich the waveguide 32 in the down track direction, the lower coil 18 includes the pair of wiring patterns 18L and 18R configuring the parallel circuit. Therefore, as compared with the case where both of the lower coil 18 and the upper coil 41 do not include parts configuring the parallel circuit, the entire resistance of the lower coil 18 and the upper coil 41 is reduced.

Figure 6B:
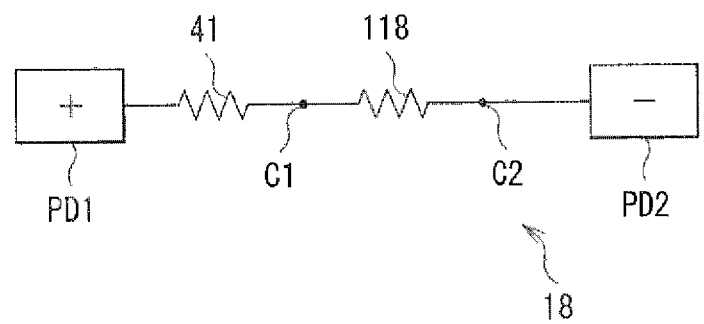
FIG. 6B is a circuit diagram for explaining connection relationship between a lower coil and an upper coil, in a magnetic read write head as a reference example.

For example, when the lower coil 18 includes the pair of wiring patterns 18L and 18R that configure the parallel circuit, the resistance between a position C1 and a position C2 may be suppressed to, for example, half of the resistance in the case where the lower coil 18 is formed of one wiring pattern 118 as illustrated in FIG. 6B. Therefore, the resistance between the pad PD1 and the pad PD2 in the present embodiment illustrated in FIG. 6A is suppressed to about 75% of the resistance between the pad PD1 and the pad PD2 in a reference example illustrated in FIG. 6B. Incidentally, here, the resistances of the upper coil 41, the wiring pattern 18L, the wiring pattern 18R and the wiring pattern 118 are assumed to be equal to one another.

Since the entire resistance of the lower coil 18 and the upper coil 41 is reduced in this way, it is possible to reduce heat quantity generated by the entire lower coil 18 and upper coil 41 at the time of write operation, and to suppress protrusion of the ABS 11S. Accordingly, it is possible to perform accurate write operation of the magnetic information and to expect improvement in the product lifetime.

In particular, in the present embodiment, since only the lower coil 18 includes the pair of wiring patterns 18L and 18R connected in parallel and the upper coil 41 is formed of one wiring pattern, it is advantageous in decrease of the magnetic path length MPL.

Moreover, the wiring patterns 18L and 18R in the pair so wind as to respectively surround the lower back gaps 19L and 19R in the pair that are oppositely arranged with the waveguide 32 extending in the height direction in between in the cross-track direction. Therefore, it is possible to make the entire write head section 16 smaller in size while securing the effective formation of the write magnetic field. Incidentally, in the formation of the pair of wiring patterns 18L and 18R configuring the parallel circuit, for example, it is possible to follow the conventional formation method by, for example, changing reticle design in photolithography. Therefore, this does not cause complication of the manufacturing process.

<6. Modification>

Figure 8A:
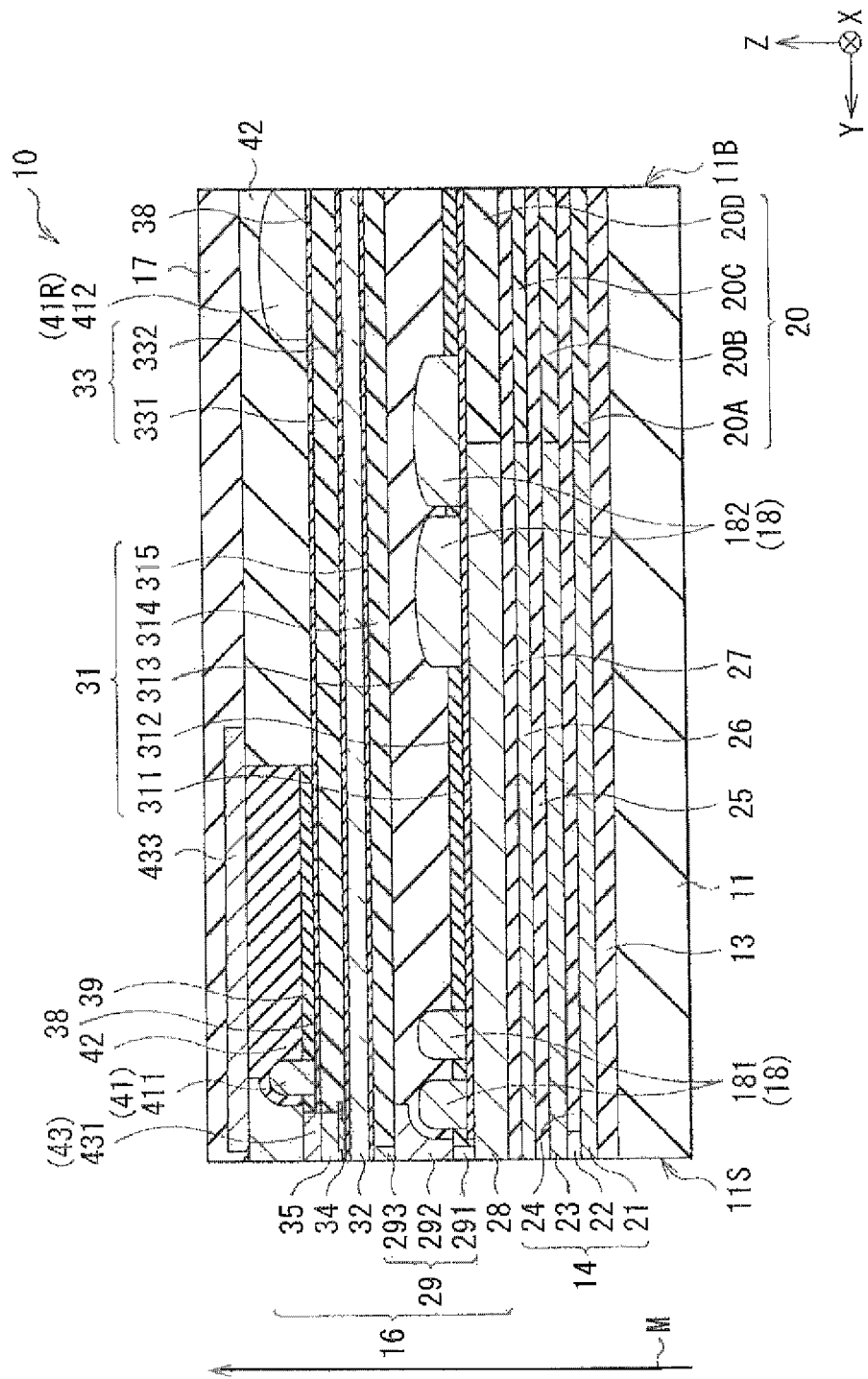
FIG. 8A is a sectional view illustrating a structure of a cross-sectional surface (YZ cross-sectional surface) orthogonal to an air bearing surface, in a magnetic read write head as a first modification.
Figure 8B:
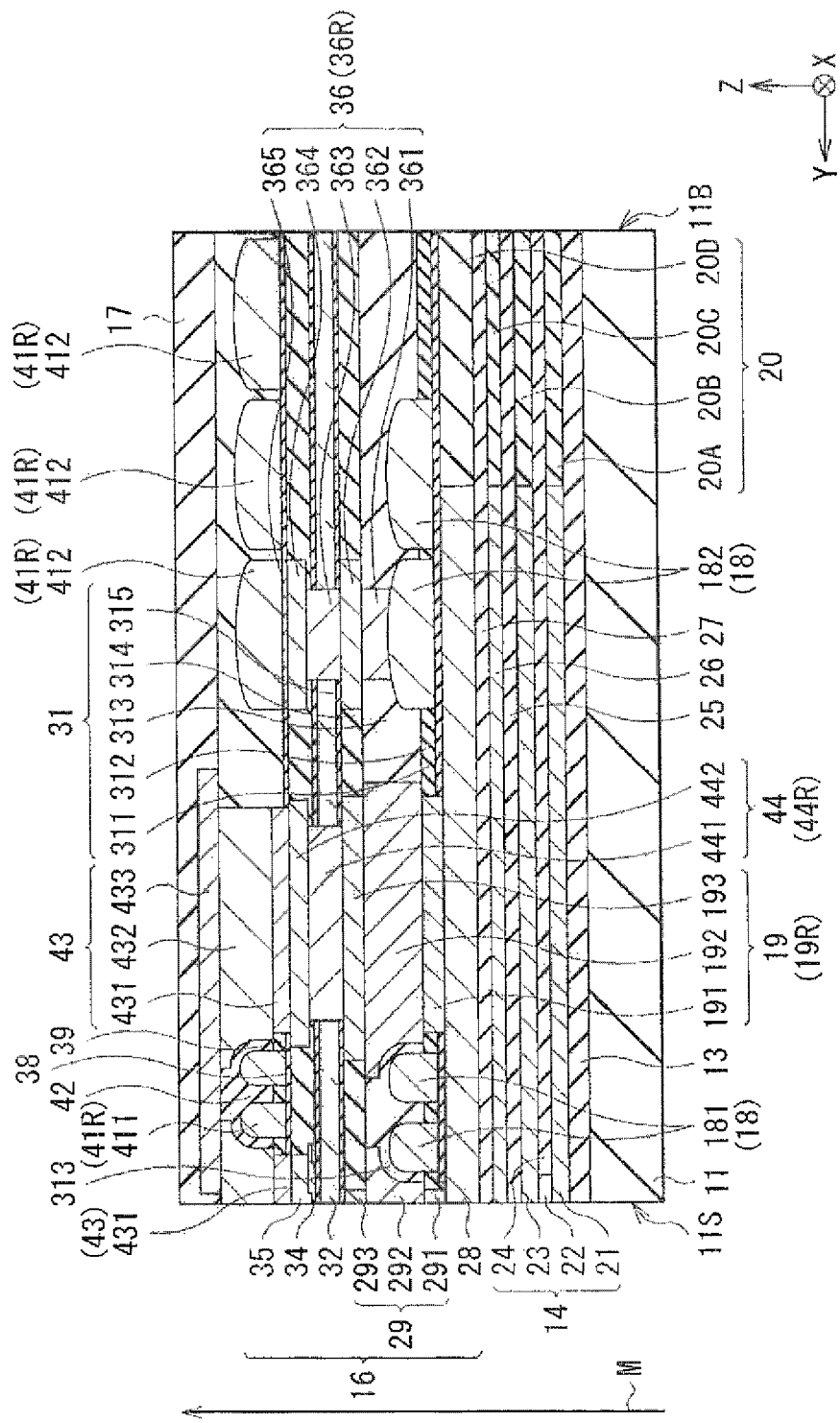
FIG. 8B is another sectional view illustrating the structure of the cross-sectional surface (the YZ cross-sectional surface) orthogonal to the air bearing surface, in the magnetic read write head as the first modification.
Figure 9A:
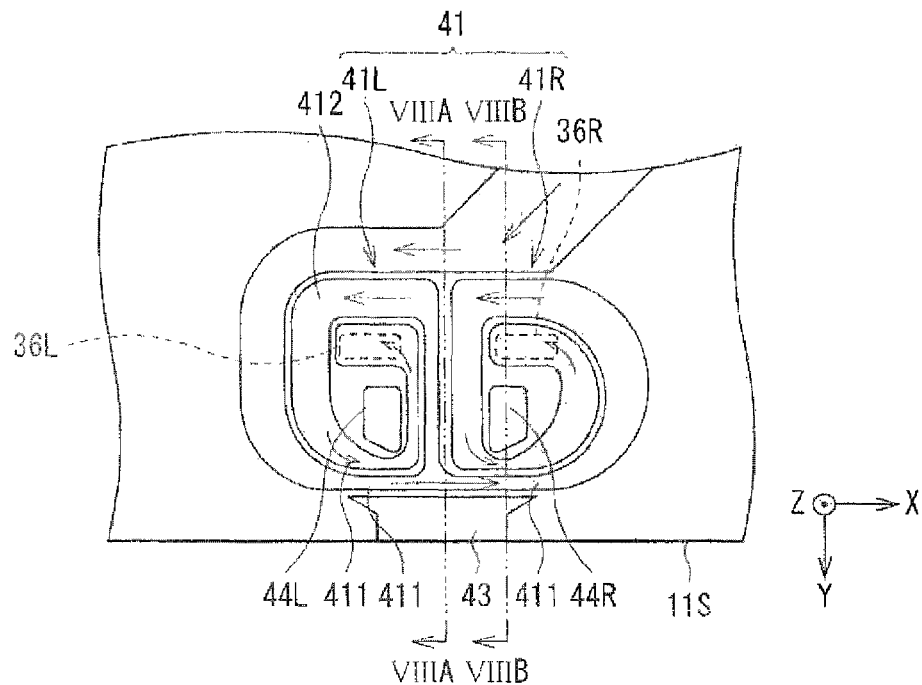
FIG. 9A is a plan view illustrating a planar shape of an upper coil illustrated in FIG. 8A and FIG. 8B.
Figure 9B:
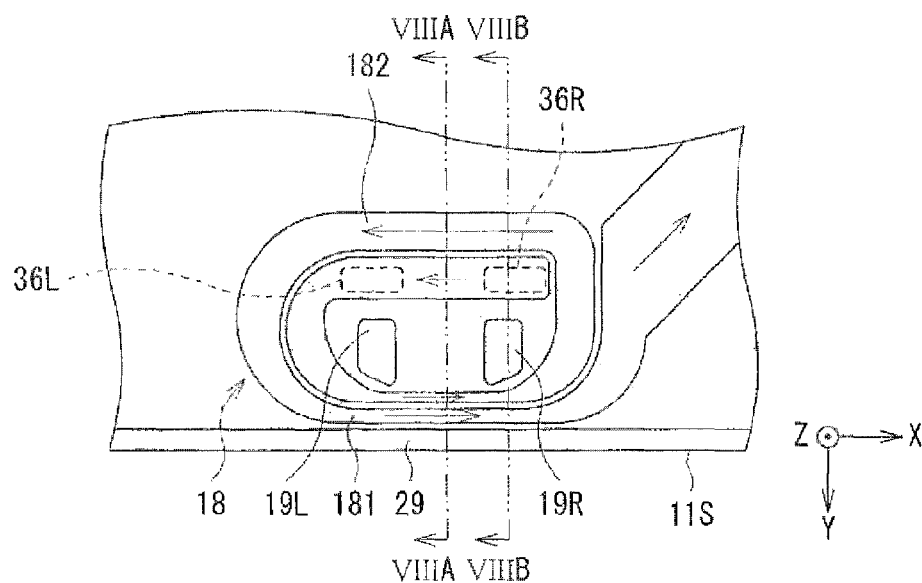
FIG. 9B is a plan view illustrating a planar shape of a lower coil illustrated in FIG. 8A and FIG. 8B.
Figure 10:
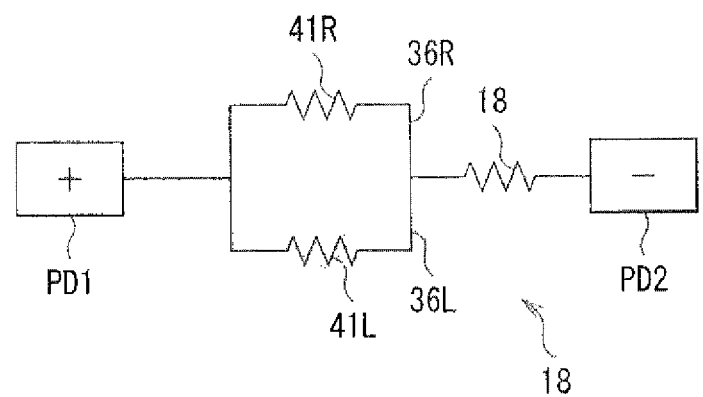
FIG. 10 is a circuit diagram for explaining connection relationship between the lower coil and the upper coil, in the magnetic read write head as the first modification.

Next, with reference to FIG. 8 to FIG. 10, a magnetic read write head 10A as a first modification of the present embodiment is described. FIGS. 8A and 8B are sectional views of the YZ surface orthogonal to the ABS 11S, in the magnetic read write head 10A. FIG. 9A is a plan view illustrating a planar shape of the upper coil 41 illustrated in FIGS. 8A and 8B, and FIG. 9B is a plan view illustrating a planar shape of the lower coil 18 illustrated in FIGS. 8A and 8B. Further, FIG. 10 is a circuit diagram for explaining connection relationship between the lower coil 18 and the upper coil 41 in the present modification. Note that FIG. 8A is a sectional view in an arrow direction along VIIIA-VIIIA line illustrated in FIGS. 9A and 9B, and FIG. 8B is a sectional view in an arrow direction along VIIIB-VIIIB line illustrated in FIGS. 9A and 9B.

In the magnetic read write head 10 according to the above-described embodiment, the lower coil 18 includes the pair of wiring patterns 18L and 18R connected in parallel. In contrast, in the present modification, the upper coil 41 includes a pair of wiring patterns 41L and 41R connected in parallel.

Specifically, in the present modification, as illustrated in FIG. 9B, the lower coil 18 includes one wiring pattern that winds in the XY plane. On the other hand, as illustrated in FIG. 9A, the upper coil 41 includes the pair of wiring patterns 41L and 41R winding in the XY plane. The wiring patterns 41L and 41R in the pair are included in the same layer, and are connected in parallel to each other (see FIG. 10). Note that the wiring pattern 41L and the wiring pattern 41R may be provided in layers different from each other; however, when both are included in the same layer, the wiring patterns are easily formed collectively, which is suitable for decrease in thickness of the write head section 16.

As illustrated in FIG. 10, an end of the upper coil 41 and an end of the lower coil 18 are connected in series, the other end of the upper coil 41 is connected to the pad PD1, and the other end of the lower coil 18 is connected to the pad PD2. For example, when a positive potential is applied to the pad PD1 and a negative potential is applied to the pad PD2, a current flows through the upper coil 41 and the lower coil 18 in directions illustrated by respective arrows, as illustrated in FIGS. 9A and 9B.

The magnetic read write head 10A of the present modification has a similar structure to that of the magnetic read write head 10 of the above-described embodiment except for the above-described points.

Since the upper coil 41 includes the pair of wiring patterns 41L and 41R connected in parallel in the present modification, protrusion of the write head section 16 on the ABS 11S is more easily suppressed as compared with the case where only the lower coil 18 includes the pair of wiring patterns 18L and 18R connected in parallel. Specifically, the lower coil 18 is disposed in a lower layer of the waveguide 32, whereas the upper coil 41 is disposed near the magnetic pole 35 and the plasmon generator 34. Therefore, moderating heat generation of the upper coil 41 makes it possible to effectively suppress the protrusion of the write head section 16 on the ABS 11S.

Moreover, since the wiring patterns 41L and 41R in the pair are so arranged as to be adjacent to each other in the cross track direction, it is possible to secure efficient formation of the write magnetic field while avoiding increase of the magnetic path length MPL.

Hereinbefore, although the invention has been described with reference to the embodiment, the invention is not limited to the above-described embodiment, and various modifications may be made. For example, in the above-described embodiment, the waveguide (the waveguide 32) is provided between the first coil (the upper coil 41) and the second coil (the lower coil 18); however, the present invention is not limited to this configuration. For example, as with a magnetic read write head 10B illustrated in FIG. 11A and FIG. 11B, a structure in which both of the first coil (the upper coil 41) and the second coil (the lower coil 18) are stacked in one side of the waveguide in the down track direction (above the waveguide in FIG. 11A and FIG. 11B) may be employed. Incidentally, FIG. 11A illustrates a stacked-layer cross-sectional surface along the down track direction at a middle position in the cross track direction, and FIG. 11B illustrates a stacked-layer cross-sectional surface along the down track direction at a position slightly away from the middle position in the cross track direction.

Figure 11A:
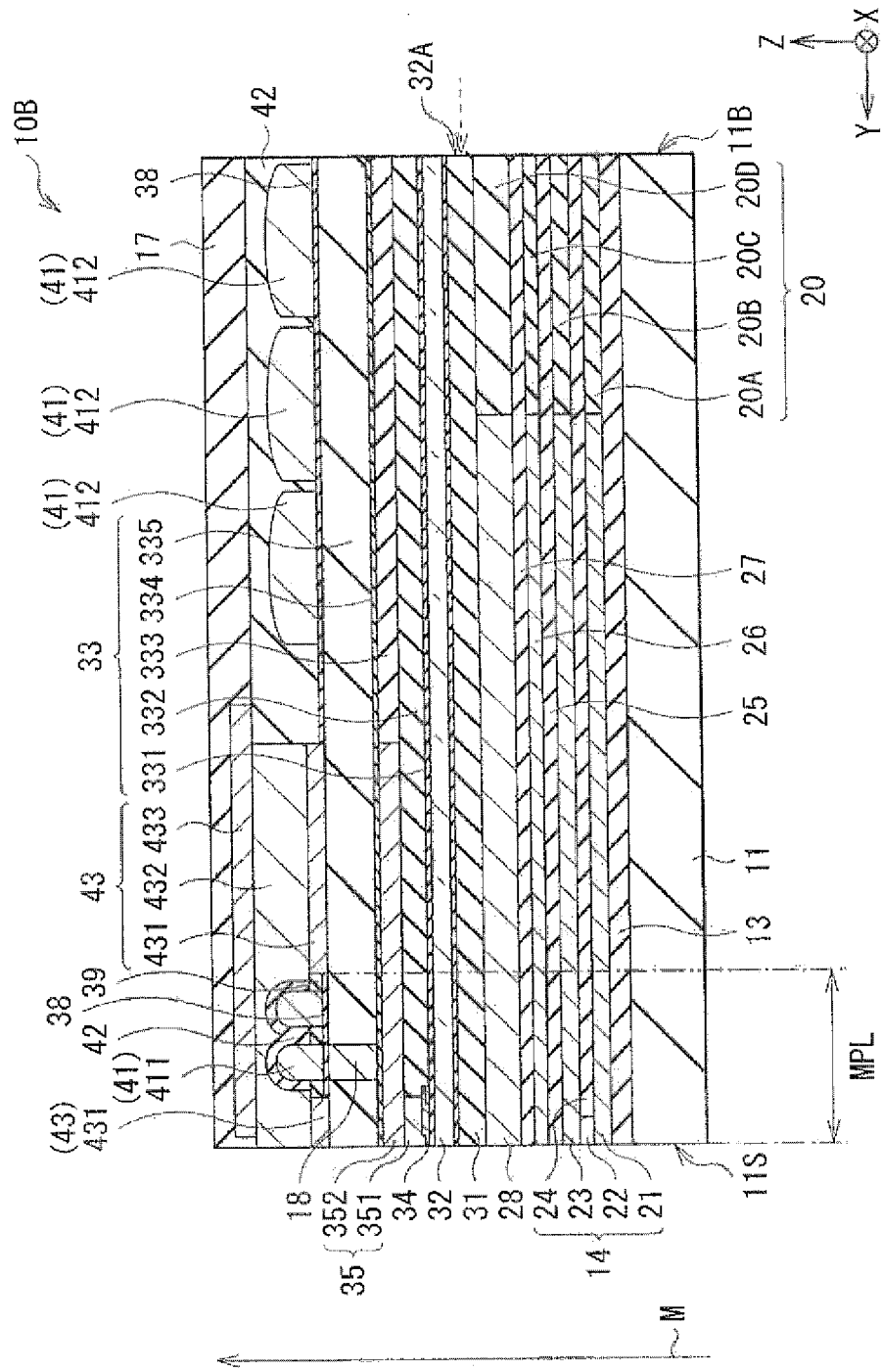
FIG. 11A is a sectional view illustrating a structure of a cross-sectional surface (YZ cross-sectional surface) orthogonal to an air bearing surface, in a magnetic read write head as a second modification.
Figure 11B:
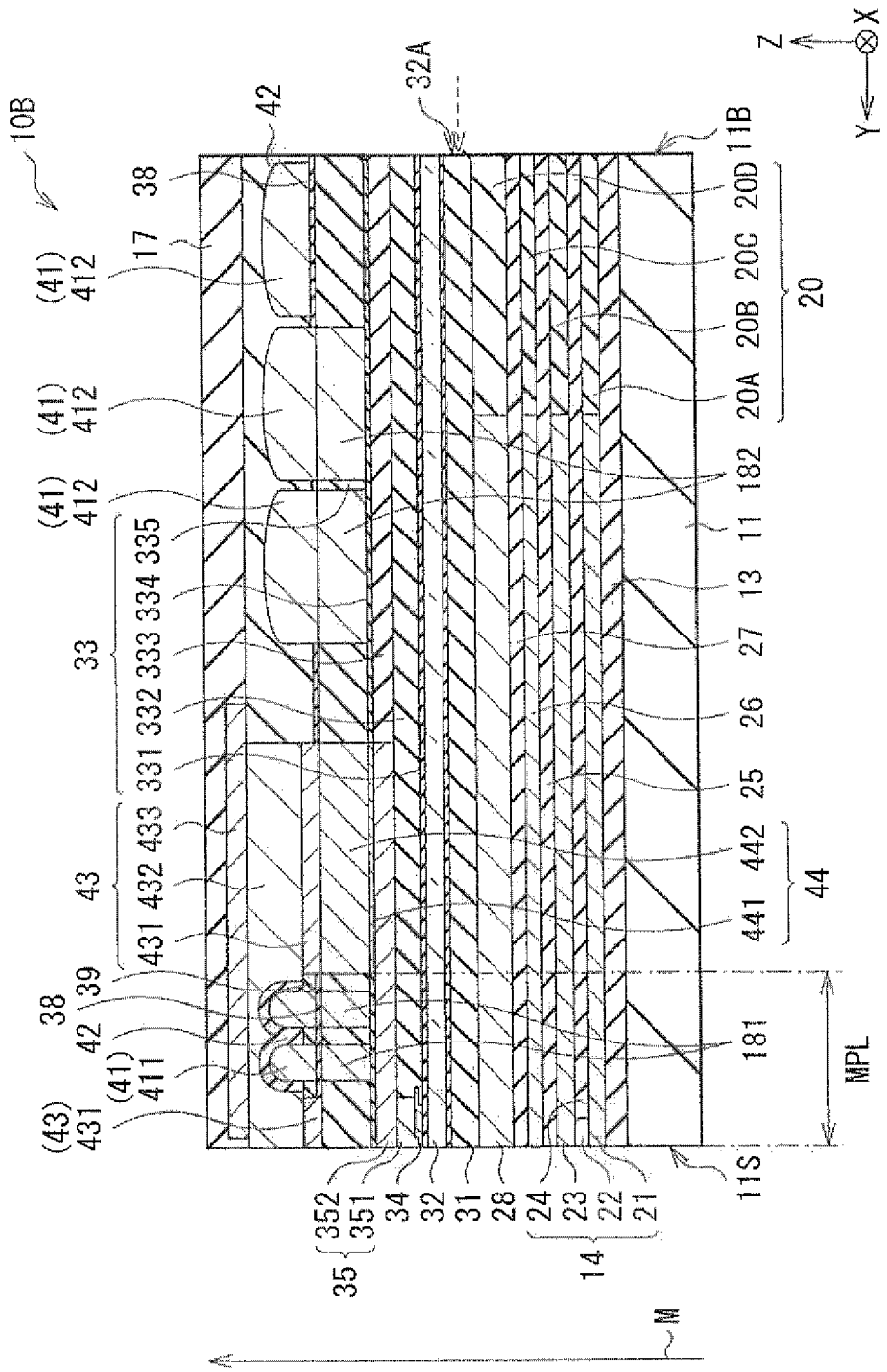
FIG. 11B is another sectional view illustrating the structure of the cross-sectional surface (the YZ cross-sectional surface) orthogonal to the air bearing surface, in the magnetic read write head as the second modification.

In the magnetic read write head 10B illustrated in FIGS. 11A and 11B, the length of the magnetic circuit is allowed to be decreased as compared with the magnetic read write head 10 illustrated in FIG. 3A and the like. The write current necessary for excitation of the magnetic circuit is allowed to be reduced by shortening of the length of the magnetic circuit, and as a result, the protrusion of the air bearing surface 11S caused by the heat generation of the upper coil 41 and the lower coil 18 is further suppressed. When the protrusion of the air bearing surface 11S is suppressed, contact between the plasmon generator 34 and the magnetic disk 2 is allowed to be avoided, which further improves reliability of the magnetic read write head.

On the other hand, as with the magnetic read write head 10 illustrated in FIG. 3A and the like, when the upper coil 41 and the lower coil 18 are disposed with the waveguide 32 in between, the generation position of the magnetic flux and the generation position of the near-field light at the time of write operation are become closer as compared with the case of the magnetic read write head 10B. Specifically, in the magnetic read write head 10, as compared with the case of the magnetic read write head 10B, the peak position of the magnetic flux and the peak position of the near-field light NF are allowed to be made closer to each other, and as a result, it can be said that this is advantageous in achievement of high recording density.

Moreover, for example, in the thermally-assisted magnetic recording head of the invention, the configurations (shapes, positional relationship, etc.) of the upper coil, the lower coil, the waveguide, the plasmon generator, the magnetic pole, and the like are not limited to those described in the above-described embodiment, and a thermally-assisted magnetic recording head having other configuration may be employed. For example, in the above-described embodiment, the laser light 45 is introduced to the waveguide 32 to generate the evanescent light 46, and the surface plasmons 47 are excited on the surface of the plasmon generator 34 to generate the near-field light NF. However, the present invention may have a configuration in which the laser light is directly irradiated to the plasmon generator 34 to generate the near-field light NF.

Moreover, in the above-described embodiment, the parallel circuit is formed by two thin film patterns; however, three or more thin film patterns may be connected in parallel.

The correspondence relationships between the reference numerals and the components of the present embodiment are collectively illustrated as follows.

1 . . . housing, 2 . . . magnetic disk, 3 . . . head arm assembly (HAA), 4 . . . head gimbal assembly (HGA), 4A . . . magnetic head device, 4B . . . suspension, 5 . . . arm, 6 . . . driver, 7 . . . fixed shaft, 8 . . . bearing, 9 . . . spindle motor, 10, 10A. 10B . . . magnetic read write head, 11 . . . slider, 11A . . . element forming surface, 11B . . . back surface, 11S . . . air bearing surface (ABS), 12 . . . element forming layer, 13 . . . insulating layer, 14 . . . read head section, 16 . . . write head section, 17 . . . protective layer, 18 . . . lower coil, 18L, 18R . . . wiring pattern, 19L, 19R . . . lower back gap, 20 (20A to 20D) . . . insulating layer, 21 . . . lower shield layer, 22 . . . MR element, 23 . . . upper shield layer, 24, 25, 27, 38, 39, 42 . . . insulating layer, 26 . . . intermediate shield layer, 28 . . . lower yoke layer, 29 . . . leading shield, 31, 33 . . . cladding layer, 32 . . . waveguide, 32A . . . backward end surface, 34 . . . plasmon generator, 34G . . . tip section, 34S1 . . . surface plasmon exciting surface, 35 . . . magnetic pole, 36L, 36R . . . contact pillar, 41 . . . upper coil, 43 . . . upper yoke layer, 44L, 44R . . . upper back gap, 45 . . . laser light, 46 . . . evanescent light, 47 . . . surface plasmon, 70 . . . adhesion layer, 80 . . . sacrifice layer, 100 . . . LSI, 101 . . . ROM, 111 . . . write gate, 121 . . . constant current circuit, 122 . . . amplifier, 123 . . . demodulation circuit, 131 . . . laser control circuit, 132 . . . temperature detector, NF . . . near-field light, MPL . . . magnetic path length.

What is claimed is:

1. A thermally-assisted magnetic recording head, comprising:
a stacked-layer structure including a first yoke, a second yoke, a first coil, a second coil, and a waveguide;
a plasmon generator;
a magnetic pole; and
one or more contact pillars connecting the first coil in series to the second coil, wherein
one or both of the first coil and the second coil include a plurality of wiring patterns connected in parallel.

2. The thermally-assisted magnetic recording head according to claim 1, wherein
the stacked-layer structure includes the first yoke, the first coil, the waveguide, the second coil, and the second yoke in order along a down track direction, and
the one or more contact pillars includes a pair of contact pillars, the pair of contact pillars are arranged opposite to each other with the waveguide in between in a cross track direction.

3. The thermally-assisted magnetic recording head according to claim 1, wherein the stacked-layer structure includes the first yoke, the first coil, the second coil, the waveguide, and the second yoke in order along a down track direction.

4. The thermally-assisted magnetic recording head according to claim 1, wherein the magnetic pole is provided between the first yoke and the plasmon generator.

5. The plurality of wiring patterns includes a pair of wiring patterns, the thermally-assisted magnetic recording head according to claim 1, wherein only the first coil includes the pair of the wiring patterns connected in parallel.

6. The thermally-assisted magnetic recording head according to claim 5, further comprising:
a pair of first back gaps connected to the first yoke, the first back gaps being arranged oppositely with the waveguide in between in the cross track direction; and
a pair of second back gaps connected to the second yoke, the second back gaps being arranged oppositely with the waveguide in between in the cross track direction, wherein
the pair of first back gaps is connected to the pair of second back gaps, respectively.

7. The thermally-assisted magnetic recording head according to claim 6, wherein
the pair of wiring patterns connected in parallel respectively surrounds the pair of first back gaps and respectively winds in a first direction, and
the second coil winds in the first direction to surround a part of the second yoke coupled with the pair of second back gaps.

8. The thermally-assisted magnetic recording head according to claim 7, further comprising
a leading shield,
wherein
the first coil and the second coil are provided at positions receded from an air bearing surface, and
the leading shield is provided between the first yoke and the air bearing surface.

9. The thermally-assisted magnetic recording head according to claim 1, wherein
only the second coil includes the pair of the wiring patterns connected in parallel.

10. The thermally-assisted magnetic recording head according to claim 1, wherein
the pair of the wiring patterns connected in parallel are included in a same layer.

11. A head gimbal assembly, comprising:
a magnetic head slider having a side surface, the side surface including the thermally-assisted magnetic recording head according to claim 1; and
a suspension having an end, the end being attached with the magnetic head slider.

12. A head arm assembly, comprising:
a magnetic head slider having a side surface, the side surface including the thermally-assisted magnetic recording head according to claim 1;
a suspension having a first end and a second end, the first end being attached with the magnetic head slider; and
an arm supporting the suspension at the second end thereof.

13. A magnetic disk unit provided with a magnetic recording medium and a head arm assembly, the head arm assembly comprising:
a magnetic head slider having a side surface, the side surface including the thermally-assisted magnetic recording head according to claim 1;
a suspension having a first end and a second end, the first end being attached with the magnetic head slider; and
an arm supporting the suspension at the second end thereof.

* * * * *